(No Model.) 5 Sheets—Sheet 1.
W. ANSON.
BREECH LOADING FIRE ARM.

No. 401,101. Patented Apr. 9, 1889.

Witnesses.
Percy B. Hills.
Robert Garrett.

Inventor.
William Anson.
By James L. Norris.
Atty.

(No Model.) 5 Sheets—Sheet 2.
W. ANSON.
BREECH LOADING FIRE ARM.
No. 401,101. Patented Apr. 9, 1889.
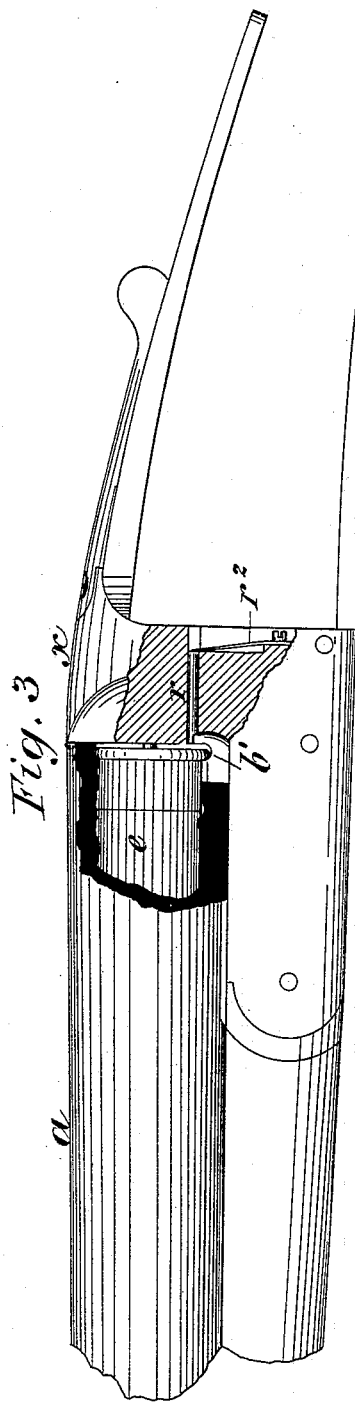
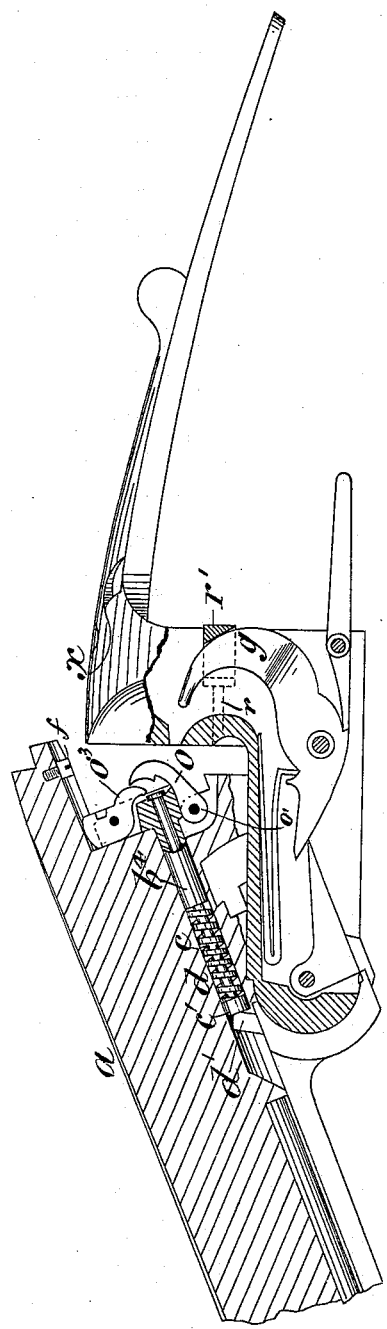
Witnesses,
Percy B. Hills.
Robert Everett.
Inventor,
William Anson
By
James L. Norris.
Atty.

(No Model.) 5 Sheets—Sheet 3.
W. ANSON.
BREECH LOADING FIRE ARM.
No. 401,101. Patented Apr. 9, 1889.
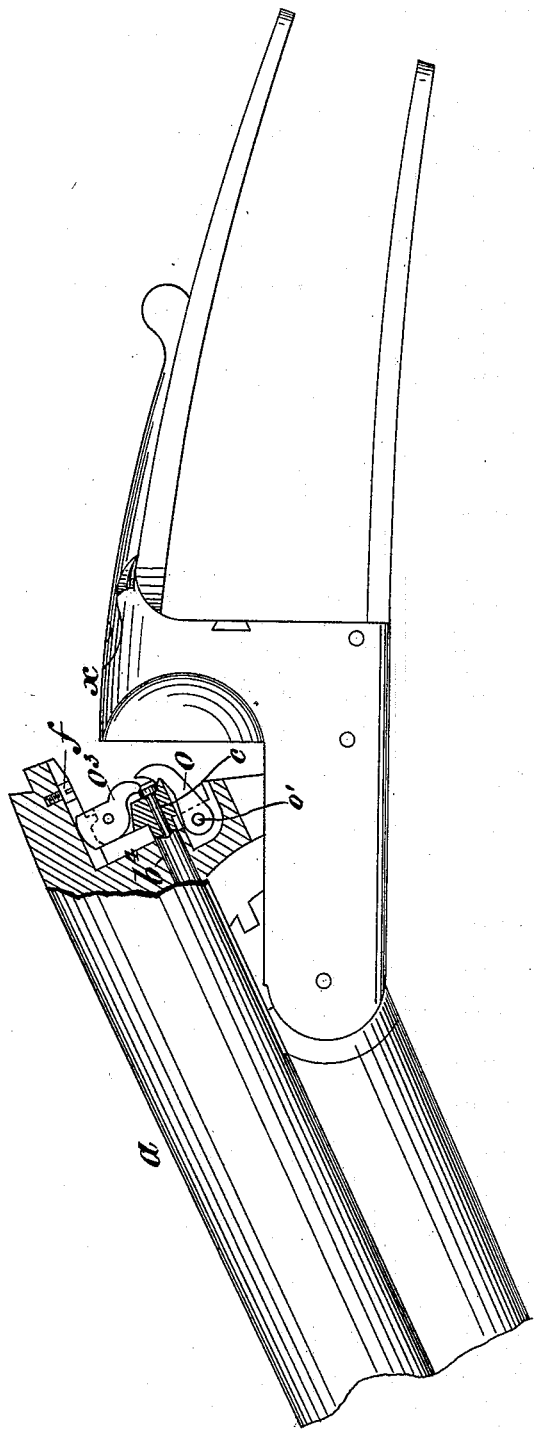

(No Model.) W. ANSON. 5 Sheets—Sheet 4.
BREECH LOADING FIRE ARM.
No. 401,101. Patented Apr. 9, 1889.
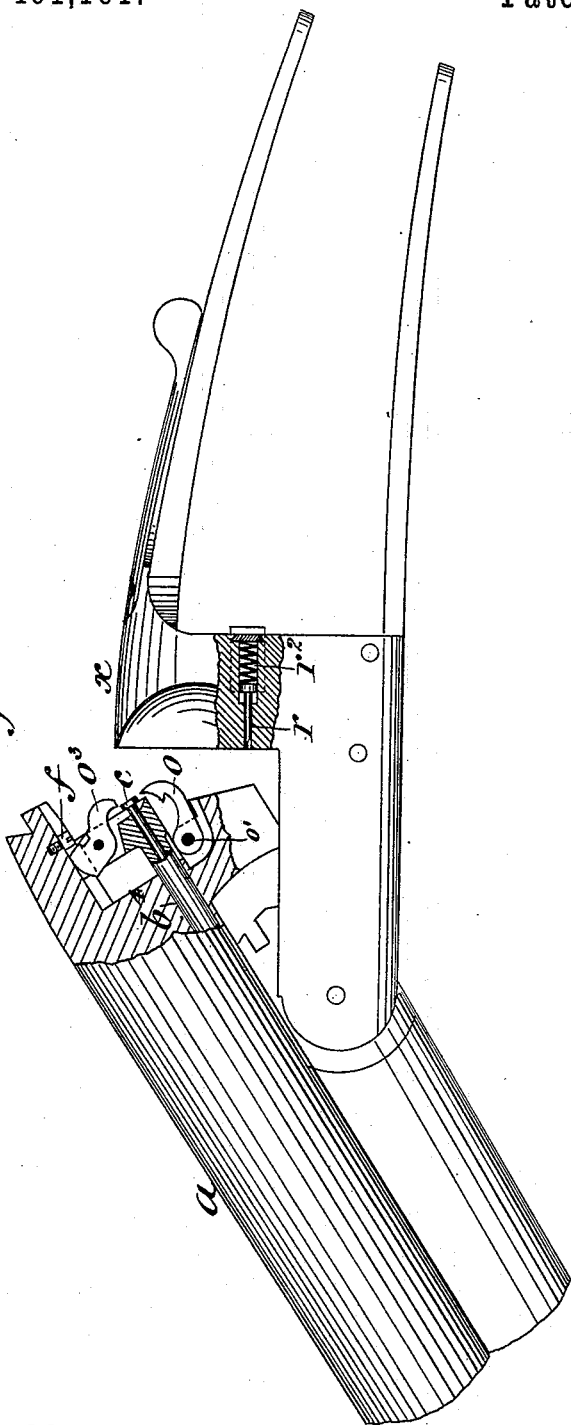
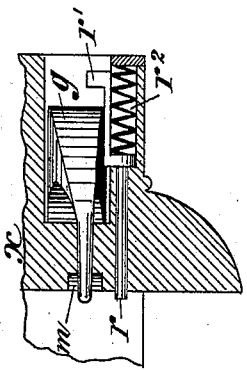
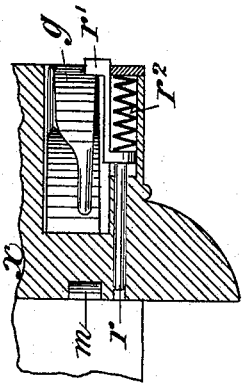
Witnesses,
Percy B. Hills.
Robert Everitt.
Inventor,
William Anson,
By James L. Norris.
Atty.

(No Model.) 5 Sheets—Sheet 5.
W. ANSON.
BREECH LOADING FIRE ARM.

No. 401,101. Patented Apr. 9, 1889.

Witnesses:
Leroy B Hills.
Robert Everett.

Inventor:
William Anson,
By James L. Norris.
Atty.

UNITED STATES PATENT OFFICE.

WILLIAM ANSON, OF BIRMINGHAM, COUNTY OF WARWICK, ENGLAND.

BREECH-LOADING FIRE-ARM.

SPECIFICATION forming part of Letters Patent No. 401,101, dated April 9, 1889.

Application filed August 8, 1888. Serial No. 282,195. (No model.) Patented in England December 9, 1886, No. 16,138.

*To all whom it may concern:*

Be it known that I, WILLIAM ANSON, gun-maker, a subject of the Queen of Great Britain, residing at Slaney Street, Birmingham, in the county of Warwick, England, have invented certain new and useful Improvements in Breech-Loading Fire-Arms, (for which I have obtained a patent in Great Britain, No. 16,138, bearing date December 9, 1886, and for a portion of which I have obtained a patent in the United States, No. 371,118, dated October 4, 1887, the application for which was filed February 11, 1887, Serial No. 227,300;) and the following is a specification of an important part of such invention, which was included in the application, but not included in the said United States Patent No. 371,118.

This invention relates to drop-barrel breech-loading fire-arms, and has for its objects to provide novel devices for extracting the empty cartridge shells or cases and to provide novel means for preventing the complete extraction or withdrawal of the cartridges from the barrels should the latter be dropped down through error prior to the firing action of the hammers.

The objects of my invention I accomplish by the features and combination of devices hereinafter described and claimed, reference being made to the accompanying drawings, in which—

Figure 1:
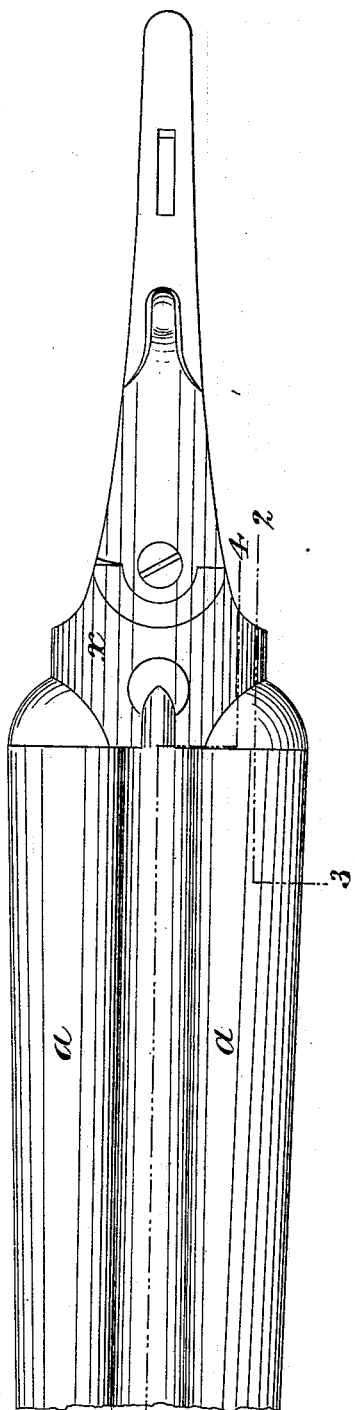
Figure 2:
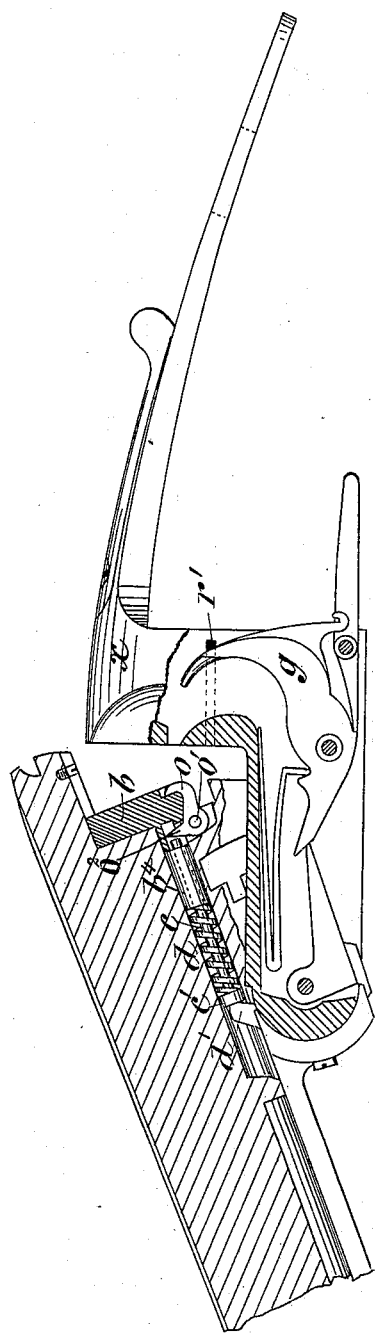
Figure 14:
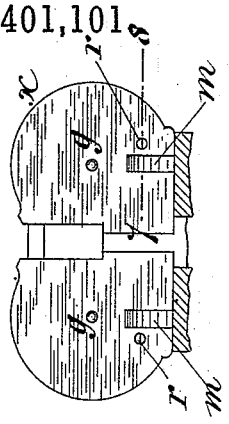
Figure 15:
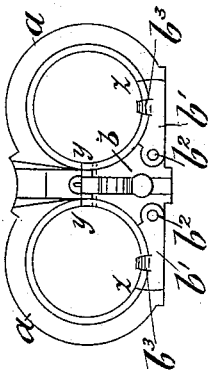
Figure 11:
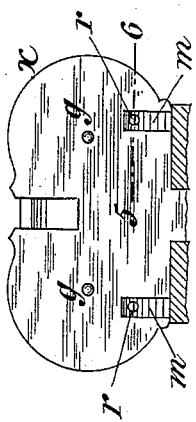
Figure 12:
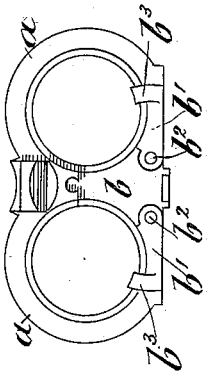
Figure 13:
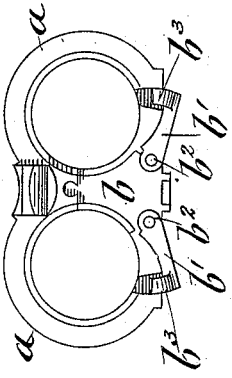
Figure 9:
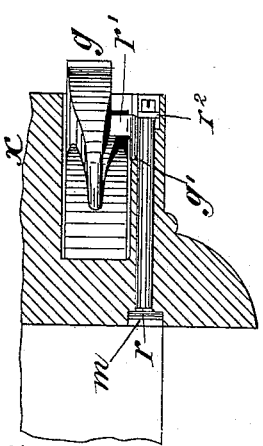
Figure 10:
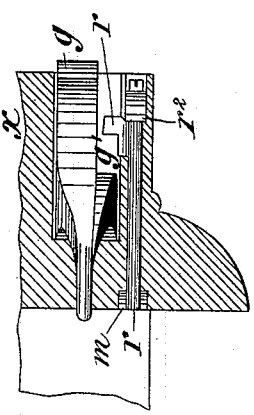

Figure 1 is a top plan view of a portion of a double-barreled breech-loading fire-arm embodying my invention. Fig. 2 is a sectional view taken on the line 1 4, Fig. 1; Fig. 3, a sectional view taken on the line 3 2, Fig. 1; Fig. 4, a view similar to Fig. 2, showing a modification of the cartridge-extracting mechanism; Fig. 5, a sectional side elevation showing parts of the devices in Fig. 4 with the barrel dropped somewhat farther down; Fig. 6, a similar view showing the barrel dropped still farther down and the extractor-ejector released to eject the empty cartridge-shell; Fig. 7, a detail sectional view on the line 7 8, Fig. 14, showing the hammer and spring-pressed plunger of the mechanism for preventing the extraction of the cartridges if the barrel be dropped before the firing action of the hammer; Fig. 8, a similar view showing the position of the plunger and hammer after the uncocking or firing action of the latter; Fig. 9, a sectional view on the line 5 6, Fig. 11, showing a modification with the hammer cocked and holding back the spring-pressed plunger; Fig. 10, a similar view showing the position of the parts after firing; Fig. 11, a front elevation of the breech-body, showing one arrangement of plungers; Fig. 12, an end view of the barrels with the pivoted dogs in position to retain the unfired cartridges; Fig. 13, a similar view showing the dogs moved to release the fired cartridges; Fig. 14, a front end view of the breech-body shown in Figs. 7 and 8 with the plungers arranged to operate in connection with the dogs shown in Figs. 15 and 16; Fig. 15, an end view of the barrels, showing the dogs in position to hold the unfired cartridges and constructed to operate in connection with the arrangement of plungers shown in Figs. 7, 8, and 14; and Fig. 16, a similar view showing the dogs released from the fired cartridges.

In order to enable those skilled in the art to make and use my invention, I will now explain my invention more in detail, referring to the drawings, wherein—

The letter $a$ indicates the pivoted drop-down barrel or barrels, $x$ the breech-body, and $b$ the extractor-ejector comprising a sleeve or tubular shank, $b^4$, and a head shaped to partly surround the breech ends of the barrels and extending from the point $y$ to the point $z$, as shown in Fig. 15. A rod, $c$, is arranged to slide lengthwise in the sleeve or shank of the extractor-ejector, and its inner end is provided with a head, $c'$, between which and the inner end of the sleeve is arranged a coiled or other suitable spring, $d$, in such manner that when the barrels are dropped down the lift $d'$ slides the rod $c$, thereby compressing the spring $d$ and tending to force the extractor-ejector outward. The extractor-ejector is, however, held or retained for a time by the catch $o$, pivoted at $o'$ to the breech ends of the barrels and having a tail-piece, $o^2$, Fig. 2, entering a slot in the sleeve $b^4$ to project into the path of the outer end of the rod $c$. The catch is hooked or similarly constructed to engage and retain the extractor-ejector against the force exerted by the compression of the spring until the rod $c$ is moved sufficient that its outer end strikes the tail $o^2$, thereby rocking the catch, disengaging it from the head of the extractor-ejector, and permitting the latter to move and dislodge or eject the empty cartridge-shell. As represented in the modification, Figs. 4, 5, and 6, the rod $c$ can slide outward through an orifice in the extractor-ejector head, and to the latter is pivoted a lever, $o^3$, adapted to lie under the catch $o$, so that the latter retains the extractor-ejector against the force of the spring $d$ until such time as the lever $o^3$ is operated to move the catch outward to disengage the catch from the extractor-ejector head. In this construction the movement of the barrel causes the rod $c$ to partially displace the catch $o$ and lever $o^3$, and, continuing the movement of the barrel, the extractor-ejector moves outward, so that the upper end of the lever strikes the pin or screw $f$, thus causing the lever $o^3$ to swing to the position shown in Fig. 6, which throws down the catch $o$ and releases the extractor-ejector, so that the latter can then eject the cartridge-shell. In Fig. 4 the parts are in the position they occupy when the barrels are but slightly dropped down. In Fig. 5 the barrels are still farther dropped down and the extractor-ejector has moved outward until it is engaged by the catch $o$, and in Fig. 6 the extractor-ejector is released and moved to the position it occupies when the empty cartridge-shell is extracted. In Fig. 3 a cartridge, $e$, is shown in a barrel ready to be fired, and to prevent the extraction of an unfired cartridge, if the barrel or barrels be dropped through error or otherwise prior to the firing movement of the hammer, I provide the following mechanism or devices, the same being described with reference to a double-barreled gun, but obviously not confined thereto.

To the head of the extractor-ejector are pivoted, by pins $b^2$ or otherwise, two swinging dogs or arms, $b'$, each having an upwardly-projecting lip, $b^3$, adapted to enter a recess, $m$, Figs. 11 or 14, in the front face of the breech-body $x$, and to engage with the rear ends or rims of the cartridges when the barrels are brought to the firing position, as in Fig. 3. These dogs must necessarily be released before the cartridges can be completely extracted, since the lips $b^3$ constitute abutments which prevent the complete withdrawal of the cartridges from the barrels until such time as the dogs are released from engagement with the rear ends of the cartridges. This disengagement in my invention can only occur when the hammers $g$, Figs. 7 and 9, are thrown to their firing position, Figs. 8 and 10; and to accomplish this I provide the breech-body $x$ with a plunger, pin, or rod, $r$, for each dog $b'$, acted on by springs $r^2$, which tend to advance the plungers toward and into engagement with the dogs, but are held against so doing so long as the hammers $g$ are cocked ready for firing by the rear of the hammer engaging with a lug, $r'$, on the plunger, Figs. 4, 7, and 8. In these figures the body of the hammer directly engages the lug $r'$; but, as shown in Figs. 9 and 10, the hammer may have a lateral projection, $g'$, to engage the lug.

Figure 16:
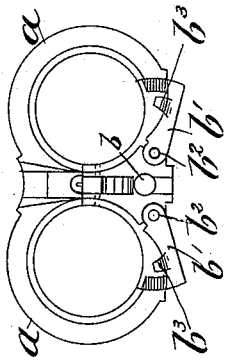

The springs $r^2$ may be flat plates, as in Fig. 3, or coiled springs, as in Figs. 7 and 8. In case the barrels are dropped down for reloading when one or both of the cartridges has or have not been fired by the hammer or hammers, such unfired cartridge or cartridges is or are held and retained in the breech by the dog or dogs, because the latter remain in the position shown in Figs. 12 and 15; but when the cartridges have been fired the hammers take the position shown in Figs. 8 and 10 and the springs $r^2$ advance the plungers $r$, so that the latter engage over the lips $b^3$, Fig. 12, or over the outer ends of the dogs $b'$, Fig. 15. The construction shown in Figs. 12 and 13 is designed to be used in connection with plungers $r$, arranged to project into the recesses $m$, Figs. 9, 10, and 11, while the construction shown in Figs. 15 and 16 is for use in connection with plungers arranged at the sides of the recesses $m$, Figs. 7, 8, and 14. When the plungers are advanced by the springs on their release by the hammers, they engage the dogs, and if the barrels be dropped the dogs are held down while the breech ends of the barrels rise, thereby releasing the cartridge-shells and permitting them to be ejected.

Having thus described my invention, what I claim is—

1. The combination, with a drop-down barrel, a breech-body, and a lift for the ejecting mechanism, of an extractor-ejector, a retaining-catch therefor on the breech end of the barrel, a rod moved lengthwise of the extractor-ejector by the lift, and a spring acting on the extractor-ejector and compressed when the rod is moved by the lift, substantially as described.

2. The combination, with a drop-down barrel, a breech-body, and a lift for the ejecting mechanism, of an extractor-ejector comprising a head and a tubular shank or sleeve extending therefrom, a lengthwise-movable rod located in the shank and having a head at its inner end to be acted on by the lift, a spring between the shank and the head of the rod, and a retaining-catch pivoted on the breech end of the barrel, substantially as described.

3. The combination, with a drop-down barrel, a breech-body, and an extractor-ejector, of a movable dog on the extractor-ejector to engage and hold an unfired cartridge, a hammer and a plunger arranged on the breech-body and released by the hammer to move into engagement with the dog for disengaging the latter from the cartridge when the barrel is dropped, substantially as described.

4. The combination, with a drop-down barrel, a breech-body, and an extractor-ejector, of a dog pivoted on the extractor-ejector to engage and hold an unfired cartridge, a plunger on the breech-body, and a hammer which holds the plunger retracted while cocked and releases such plunger when uncocked and permits the latter to advance and engage the dog, substantially as described.

5. The combination of a drop-down barrel, a breech-body, and an extractor-ejector, of a dog pivoted on the extractor-ejector and having a lip to engage and hold an unfired cartridge, a plunger on the breech-body having a lateral lug, a spring for advancing the plunger to engage the dog, and a hammer which holds the plunger retracted when cocked, substantially as described.

WILLIAM ANSON.

Witnesses:
W. H. HARRIS,
*Solicitor and Notary, Birmingham, England.*
ALBERT NEWEY,
*Solicitor's Clerk, Birmingham.*